Jan. 19, 1965     G. DAVIS     3,166,344
COUPLING

Filed Dec. 5, 1960     4 Sheets-Sheet 1

INVENTOR.
GEORGE DAVIS
BY M. A. Hobbs
ATTORNEY

INVENTOR.
GEORGE DAVIS
BY M. A. Hobbs
ATTORNEY

Jan. 19, 1965   G. DAVIS   3,166,344
COUPLING

Filed Dec. 5, 1960   4 Sheets-Sheet 3

INVENTOR.
GEORGE DAVIS
BY M. A. Hobbs
ATTORNEY

Jan. 19, 1965

G. DAVIS 3,166,344

COUPLING

Filed Dec. 5, 1960

INVENTOR.
GEORGE DAVIS
BY M. A. Hobbs
ATTORNEY

United States Patent Office 3,166,344
Patented Jan. 19, 1965

3,166,344
COUPLING
George Davis, Dowagiac, Mich., assignor, by mesne assignments, to Link Belt Company, a corporation of Illinois
Filed Dec. 5, 1960, Ser. No. 73,717
7 Claims. (Cl. 285—134)

The present invention relates to fluid transmission mechanisms, and more particularly to a coupling for connecting a plurality of hyrdaulic lines between two relatively rotatable structures, such as for example, between the platform and base of an excavator, derrick, road grading equipment and similar machinery. In machinery of this type it is usually a definite advantage to be able to rotate the platform through three hundred and sixty degrees during various operations being performed by the equipment, and to continue the operation without reversing and returning the platform through a complete revolution to its original position relative to its supporting base. Since most conventional equipment of the foregoing type of modern construction includes hydraulically operated motors on the vehicle portion thereof controlled by the operator from his seat on the platform, the lines between the motor and the operator's controls often interfere with the free operation of the platform, particularly with complete three hundred and sixty degree rotation of the platform relative to the vehicle bed, requiring the operator to reverse the rotation of the platform and return it to its original position. It is therefore one of the principal objects of the present invention to provide a coupling between fluid lines of two relatively rotatable structures, which permits the two structures to rotate freely without any interference from the fluid lines on the two structures or from the coupling connecting the respective lines between the two structures.

Another object of the present invention is to provide a hydraulic and/or pneumatic coupling for use in conjunction with a vehicle and rotatable platform which can be incorporated in conventional equipment of the aforesaid type without any substantial modifications or changes in the equipment being required, and which can readily be installed in the equipment and thereafter easily serviced.

Still another object of the invention is to provide an efficient, reliable and compact coupling for connecting a plurality of independent fluid lines between two relatively rotatable members which will permit the two members to rotate freely without any interference from the coupling or the fluid lines on either side thereof.

A further object is to provide a coupling of the aforesaid type which can be easily adapted to various types of relatively rotating structures and pivot mechanisms therefor, and which can be used for transmitting various kind of fluids simultaneously, regardless of the spacing between two relatively rotatable structures, either under pressure or as a vacuum.

Additional objects and advantages of the present invention will become apparent from the following description and accompanying drawings, wherein.

Figures 1, 2:
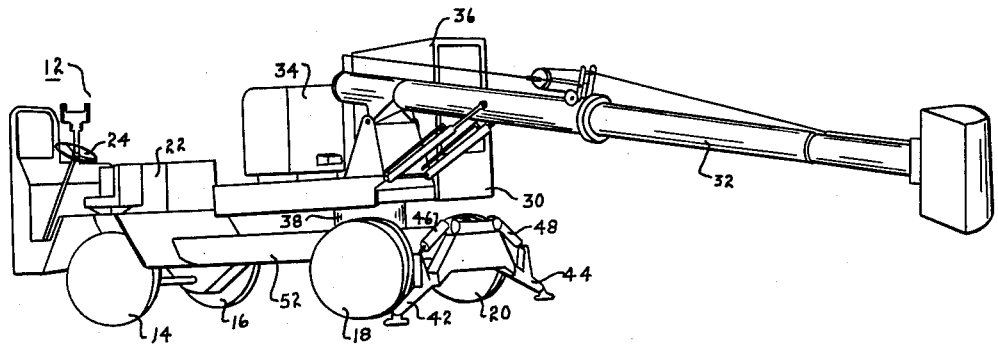
FIGURE 1 is a perspective view of an excavator on which my present hydraulic coupling is mounted.
FIGURE 2 is a top plan view of my coupling showing a fragmentary portion of the platform of the excavator of FIGURE 1.
Figure 3:
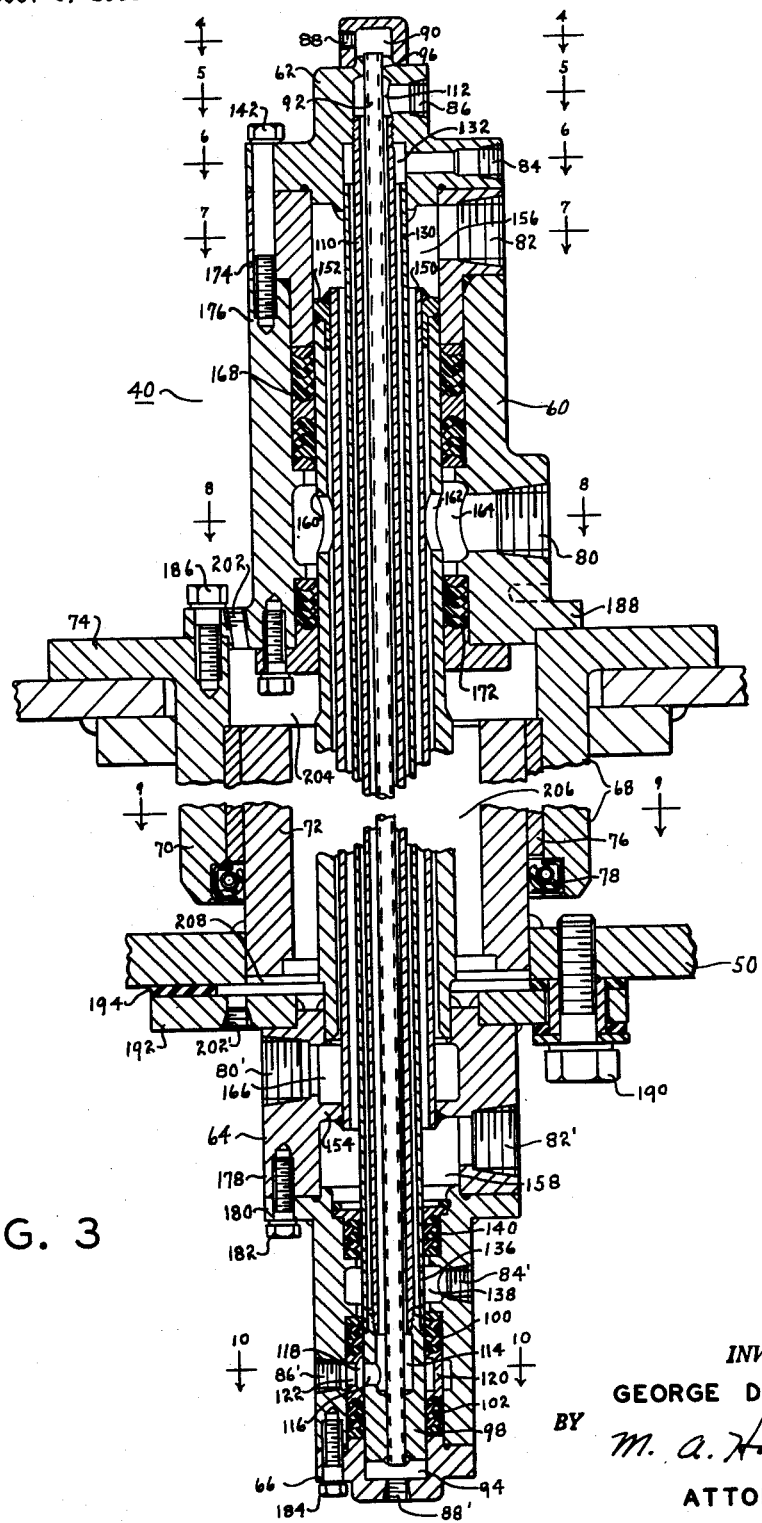
FIGURE 3 is a vertical cross sectional view of the present coupling taken on line 3—3 of FIGURE 2.
Figure 4:
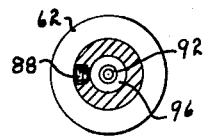
FIGURE 4 is a horizontal cross sectional view of the coupling taken on line 4—4 of FIGURE 3.
Figure 5:
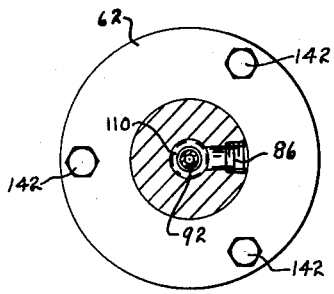
FIGURE 5 is a horizontal cross sectional view of the coupling taken on line 5—5 of FIGURE 3.
Figure 6:
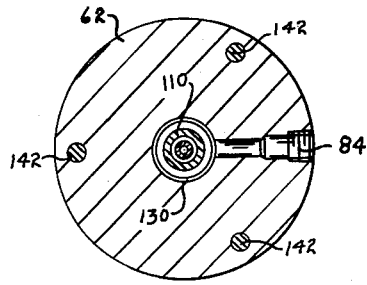
FIGURE 6 is a horizontal cross sectional view of the coupling taken on line 6—6 of FIGURE 3.
Figure 7:
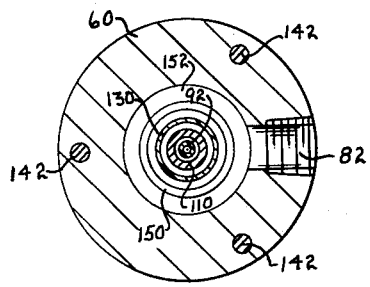
FIGURE 7 is a horizontal cross sectional view of the coupling taken on line 7—7 of FIGURE 3.
Figure 8:
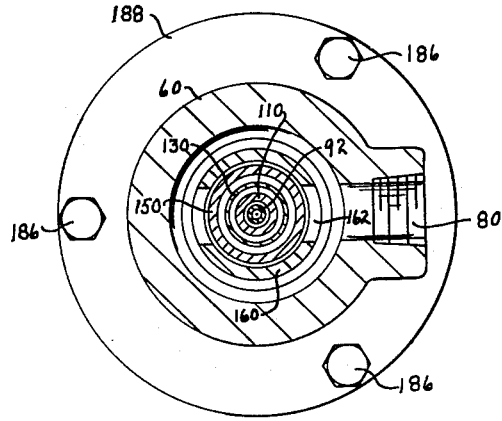
FIGURE 8 is a horizontal cross sectional view of the coupling taken on line 8—8 of FIGURE 3.
Figure 9:
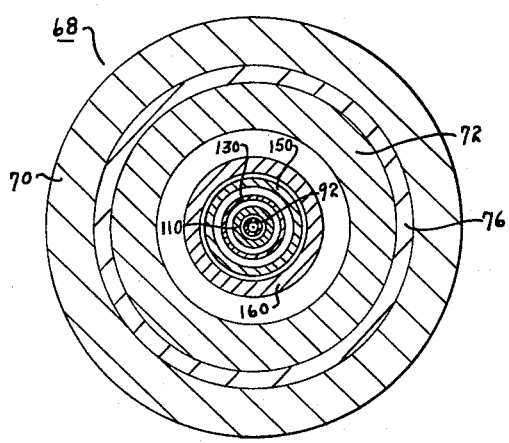
FIGURE 9 is a horizontal cross sectional view of the coupling taken on line 9—9 of FIGURE 3.
Figure 10:
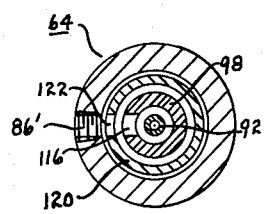
FIGURE 10 is a horizontal cross sectional view of the coupling taken on line 10—10 of FIGURE 3.
Figure 11:
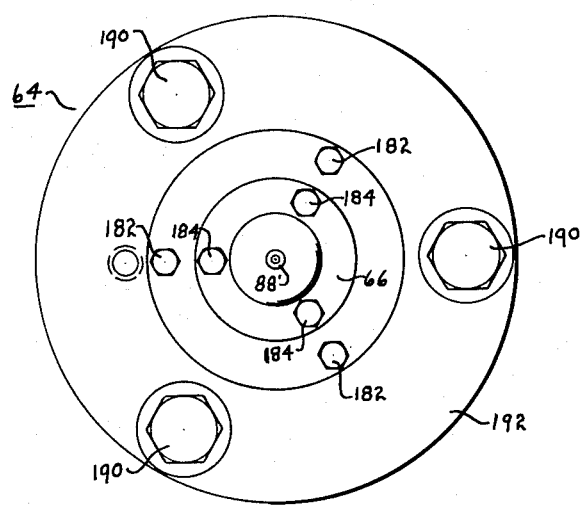
FIGURE 11 is a bottom view of the coupling shown in the preceding figures.

Referring more specifically to the drawings, FIGURE 1 illustrates one type of vehicle or mechanism on which the present coupling is adapted to operate, said vehicle briefly consisting of a truck 12 having wheels 14, 16, 18 and 20, an engine enclosed in hood 22, and a steering mechanism 24, and having pivotally mounted thereon a platform 30 for a boom 32 of an excavator, the platform and boom being operated by an engine in housing 34 and controlled from an operator's station 36 on the platform. The platform can be rotated three hundred and sixty degrees continuously on pivot mechanism 38 in which my present coupling 40 is mounted. The means of rotating the platform may consist of gears or any of several other types of drive mechanisms, although the present invention is not limited to any particular type, nor is it limited to any particular truck, engines, or work performing equipment mounted on the platform. The type of equipment shown in FIGURE 1 normally includes outriggers 42 and 44 operated by hydraulic cylinders 46 and 48 controlled by the operator from station 36. Pivot mechanism 38 is secured to the underside of platform 30 and is mounted on a base 50 rigidly secured to frame 52 of vehicle 12.

The present hydraulic coupling 40 consists generally of an upper body 60, a top cap 62, a lower body 64, a bottom cap 66, and an intermediate body 68 consisting of two telescopic, relatively rotatable sections 70 and 72, section 70 having a flange 74 and being secured to platform 30 by bolts or other suitable securing means. The two telescopic sections 70 and 72 are separated by a bearing 76, sealed from the atmosphere by an annular gasket 78. The intermediate body is formed in the two telescopic sections to permit the upper portion of the coupling to rotate relative to the lower portion and to permit the coupling to be adjusted to various distances between the platform and the base. The coupling contains a number of fluid inlet and fluid outlet ports through which the fluid will normally flow in both directions, i.e. into the coupling and from the coupling, as fluid actuated motors or cylinders are operated to one position and then returned to their original position. However, for convenience of description, the ports in body 60 and cap 62 will be referred to as inlet ports, and the ports in body 64 and cap 66 will be referred to as outlet ports.

In the particular embodiment shown in the drawings, the coupling is adapted to connect five separate fluid lines on the platform with a corresponding number of fluid lines on the base vehicle, the upper body portion 60 and cap 62 containing fluid inlet ports 80, 82, 84, 86 and 88 and the lower body and bottom cap containing fluid outlet ports 80′, 82′, 84′, 86′ and 88′. Port 88 is connected with port 88′ by a chamber 90 in cap 62, a centrally located tube 92 extending substantially the full length of the coupling, and a chamber 94 in bottom cap 66. The tube 92 is rigidly joined to cap 62 at internal flange 96 to rotate in unison with the upper body 60 and cap 62, and to a cylindrical sleeve 98 secured by welding, brazing or other suitable means to the lower end of the tube. Sleeve 98 rotates freely in body 64 and is sealed in fluid tight relationship with the internal wall of the body by a series of gaskets indicated by numerals 100 and 102. With this construction, fluid can flow from port 88 without any leakage through tube 92 to port 88′, and body 60 can rotate relative to body 64 throughout three hundred and sixty degrees.

Port 86 is connected to port 86' by a tube 110 threadedly received in cap 62 at its upper end and threadedly received in sleeve 98 at its lower end, tube 110 enclosing tube 92 and being arranged concentrically therewith. With this construction, fluid can flow between port 86 and port 86' by passing through an upper chamber 112, tube 110, lower chamber 114, port 116 in sleeve 98, and annular chamber 118, divided into outer and inner annular passages by a spacer member 120 forming a part of gaskets 100 and 102 through which a port 122 extends.

Port 84 is connected to port 84' by a tube 130 secured to and extending from cap 62 to sleeve 98 to which it is secured in fluid tight relationship, tube 130 being concentric with tubes 92 and 110 and being adapted to rotate in unison with body 60 and cap 62 relative to body 64. With this construction, fluid can pass between ports 84 and 84' through chamber 132, tube 130, port 136, and annular chamber 138. A gasket construction 140 forms a fluid tight relationship between the external surface of tube 130 and internal wall of body 64. From the foregoing description of tubes 92, 110 and 130, it is apparent that a unitary structure consisting of these three tubes and cap 62 has been formed. This structure is secured in place after the tubes have been extended downwardly through bodies 60, 64 and 68 by a plurality of bolts 142 extending downwardly through the cap 62 into body 60.

Port 82 is connected to port 82' through a tube 150 concentric with tubes 92, 110 and 130 rigidly connected at its upper end to an annular flange member 152 by a welded or brazed joint, and connected at its lower end to internal flange 154 of body 64 by a similar type joint. With this construction, fluid can flow between ports 82 and 82' through chamber 156, tube 150 and chamber 158.

Port 80 is connected to port 80' by a tube 160 having a port 162 therein, communicating with an annular chamber 164 which in turn communicates with port 80, and the chamber 166 which communicates with port 80'. Tube 160 is joined rigidly to lower body 64 at its lower end and is sealed in fluid tight relationship with the internal wall of body 60 by a gasket construction shown at numeral 168, and with annular member 152 by welding or brazing. With this construction, fluid can flow between ports 80 and 80' through chamber 164, port 162, tube 160 and chamber 166. Tubes 150 and 160, being joined integrally to body 64, form a unitary structure therewith which is assembled into bodies 60 and 68, and which rotates with body 64 relative to body 60. It is thus seen that body portion 60, cap 62, and tubes 92, 110 and 130 rotate in unison relative to body 64, cap 66, and tubes 150 and 160, permitting complete three hundred and sixty degree rotation of the upper portion of the coupling with respect to the lower portion thereof as platform 30 rotates relative to vehicle base 50.

Ports 80 and 82 are separated from one another in fluid tight relationship by gasket 168, and port 80 is sealed from leakage from the coupling by a gasket construction 172. Port 82' is separated from port 84', and the latter port from port 86', by gasket constructions 140 and 100, respectively. Port 86' is separated from port 88' by gasket construction 102. In order to facilitate assembly of the various gasket constructions and tube assemblies, body 60 is separated into two sections 174 and 176, and body 64 is separated into two sections 178 and 180, the sections of body 60 being secured together by a plurality of bolts 142, and the sections of body 64 being secured together by a plurality of bolts 182. Bottom cap 66 is secured to the lower body 64 by a plurality of bolts 184. Body 60 is assembled on the upper section of body 68, and secured thereto by a plurality of bolts 186 extending downwardly through the flange 188 into flange 74 of section 70, and body 64 is secured to base 50 by a plurality of bolts 190 extending upwardly through an annular flange 192 being held in a fluid tight relationship with base 50 by an annular gasket 194.

In addition to the five separate passages described above, a sixth passage for low pressure fluid is provided, consisting of ports 202 and 202' connected by passage 204, annular chamber 206 and passage 208. Gasket 78 seals chamber 206 from leakage without interfering with the relative rotation of sections 70 and 72.

While the operation of the present coupling is apparent from the foregoing description of the construction thereof, the operation will be briefly described. After the coupling has been mounted on a vehicle, such as that shown in FIGURE 1, various fluid conduits are connected to ports 80, 82, 84, 86 and 88 on the platform, and to ports 80', 82', 84', 86' and 88' on the truck portion of the vehicle. All five lines interconnected by the present coupling may be hydraulic fluid transmission lines, all compressed air lines, or one or more may be hydraulic and one or more compressed air transmission lines. After the lines have been connected to the respective ports, rotation of platform 30 causes body 60, cap 62, and tubes 92, 110 and 130 to rotate therewith relative to base 50 and tubes 150 and 160, body 64 and cap 66. Since the present coupling passes from the platform through the pivot mechanism in axial alignment therewith to the base vehicle, the platform can rotate continuously through a three hundred sixty degree angle without reversing and without disturbing the hydraulic or pneumatic lines on either the platform or the base vehicle. The telescopic body 68 permits the two bodies 60 and 64 to rotate freely relative to one another and permits the coupling to be easily adjusted to various distances between the relatively rotatable structure, as well as slight variations in the distance between the structures during operation of the vehicle.

One of the special advantages of the present coupling is the fact that it is not limited in length, as are conventional couplings, since the tubes connecting the inlet and outlet ports may readily be made any desired length before they are assembled in the final coupling structure. While five concentric fluid conduits have been incorporated in the present coupling, a lesser or greater number of such conduits can be included if desired. Various other changes and modifications can be made without departing from the scope of the present invention.

I claim:

1. A coupling for connecting a plurality of hydraulic lines on one structure with the corresponding lines on a structure rotatable relative to and spaced from said first structure, comprising an upper body having a cylindrical vertical chamber therein and a flange for securing said body to one of said structures, a lower body having a cylindrical vertical chamber therein in alignment with said first cylindrical chamber and a flange for securing said lower body to the other of said structures, each of said bodies having first, second, third, fourth, and fifth ports spaced longitudinally therealong from the outer ends toward the respective flange for connection with hydraulic lines, a third body between said first and second bodies having two cylindrical telescopic sections rotatable relative to each other and with the first and second bodies, respectively, said sections forming a low pressure fluid chamber with ports therefor adjacent said first mentioned bodies, the ports of said low pressure chamber being formed in the relatively rotatable upper and lower bodies, a tube extending longitudinally in both vertical chambers and connecting said first ports and being rigidly joined to said upper body for rotation therewith and yieldably connected in fluid tight relation to said lower body for relative rotation therewith, a tube extending longitudinally in both vertical chambers around said first mentioned tube connecting said second ports and being rigidly joined to said upper body for rotation therewith and yieldably connected in fluid tight relation to said lower body for relative rotation therewith, a tube extending longitudinally in both vertical chambers around said first and second mentioned tubes connecting said third ports and being rigidly joined to said upper body for rotation therewith and yieldably connected in fluid tight relation to said lower body for relative rotation therewith, a tube extending longitudinally in both vertical chambers around said previously mentioned tubes connecting said fourth ports and being rigidly joined to said lower body for rotation therewith and yieldably connected in fluid tight relation to said upper body for relative rotation therewith, and a tube extending longitudinally in both vertical chambers around said previously mentioned tubes connecting said fifth ports and being rigidly joined to said lower body for rotation therewith and yieldably connected in fluid tight relation to said upper body for relative rotation therewith.

2. A coupling for connecting a plurality of hydraulic lines on one structure with the corresponding lines on a structure rotatable relative to said first structure, comprising a first body having a cylindrical chamber therein and a means for securing said body to one of said structures, a second body having a cylindrical chamber therein in alignment with said first cylindrical chamber and a means for securing said second body to the other of said structures, each of said bodies having first, second, third, fourth and fifth ports spaced longitudinally therealong from the outer ends toward the respective securing means for connection with hydraulic lines, a third body between said first and second bodies having two relatively rotatable cylindrical telescopic sections forming a fluid chamber, said fluid chamber having inlet and outlet ports formed in the means for securing said first and second bodies, respectively, to said relatively rotatable structures, a tube extending longitudinally in the chambers of said first and second bodies and connecting said first ports and being rigidly joined to said first body for rotation therewith and yieldably connected in fluid tight relation to said second body for relative rotation therewith, a tube extending longitudinally in the chambers of said first and second bodies around said first mentioned tube connecting said second ports and being rigidly joined to said first body for rotation therewith and yieldably connected in fluid tight relation to said second body for relative rotation therewith, a tube extending longitudinally in the chambers of said first and second bodies around said first and second mentioned tubes connecting said third ports and being rigidly joined to said first body for rotation therewith and yieldably connected in fluid tight relation to said second body for relative rotation therewith, a tube extending longitudinally in the chambers of said first and second bodies around said previously mentioned tubes connecting said fourth ports and being rigidly joined to said second body for rotation therewith and yieldably connected in fluid tight relation to said first body for relative rotation therewith, and a tube extending longitudinally in the chambers of said first and second bodies around said previously mentioned tubes connecting said fifth ports and being rigidly joined to said second body for rotation therewith and yieldably connected in fluid tight relation to said first body for relative rotation therewith.

3. A coupling for connecting a plurality of hydraulic lines on one strutcure with the corresponding lines on a structure rotatable relative to said first structure, comprising a first body having a chamber therein and a means for securing said body to one of said structures, a second body having a chamber therein in alignment with said first chamber and a means for securing said second body to the other of said structures, each of said bodies having first, second, third, fourth and fifth ports spaced longitudinally therealong from the outer ends toward the respective securing means for connection with hydraulic lines, a third body between said first and second bodies having two relatively rotatable cylindrical telescopic sections forming a chamber, said fluid chamber having inlet and outlet ports formed in the means for securing said first and second bodies, respectively, to said relatively rotatable structures, a tube extending longitudinally in the chambers of said first and second bodies and connecting said first ports and being rigidly joined to said first body for rotation therewith and yieldably connected to said second body for relative rotation therewith, a tube extending longitudinally in the chambers of said first and second bodies around said first mentioned tube connecting said second ports and being rigidly joined to said first body for rotation therewith and yieldably connected to said second body for relative rotation therewith, a tube extending longitudinally in the chambers of said first and second bodies around said first and second mentioned tubes connecting said third ports and being rigidly joined to said first body for rotation therewith and yieldably connected to said second body for relative rotation therewith, a tube extending longitudinally in the chambers of said first and second bodies around said previously mentioned tubes connecting said fourth ports and being rigidly joined to said second body for rotation therewith and yieldably connected to said first body for relative rotation therewith, and a tube extending longitudinally in the chambers of said first and second bodies around said previously mentioned tubes connecting said fifth ports and being rigidly joined to said second body for rotation therewith and yieldably connected to said first body for relative rotation therewith.

4. A coupling for connecting a plurality of fluid lines on one structure with the corresponding lines on a structure rotatable relative to said first structure, comprising a first body having a chamber therein, a second body having a chamber therein, each of said bodies having first, second, third, and fourth ports spaced inwardly longitudinally therealong from the outer ends for connection with fluid lines, a third body between said first and second mentioned bodies having two cylindrical relatively rotatable sections forming a low pressure fluid chamber with ports therefor adjacent said first mentioned bodies, the ports of said low pressure chamber being formed in said first mentioned bodies a tube connecting said first ports and being rigidly joined to said first body for rotation therewith and yieldably connected to said second body for relative rotation therewith, a tube extending longitudinally in the chambers of said first and second bodies around said first mentioned tube connecting said second ports and being rigidly joined to said first body for rotation therewith and yieldably connected to said second body for relative rotation therewith, a tube extending longitudinally in the chambers of said first and second bodies around said previously mentioned tubes connecting said third ports and being rigidly joined to said second body for rotation therewith and yieldably connected to said first body for relative rotation therewith, and a tube extending longitudinally in the chambers of said first and second bodies around said previously mentioned tubes connecting said fourth ports and being rigidly joined to said second body for rotation therewith and yieldably connected to said first body for relative rotation therewith.

5. A coupling for connecting a plurality of fluid lines on one structure with the corresponding lines on a structure rotatable relative to said first structure, comprising a first body having a chamber therein, a second body having a chamber therein, each of said bodies having first, second, third, and fourth ports spaced inwardly longitudinally therealong from the outer ends for connection with fluid lines, a third body between said first and second mentioned bodies having two cylindrical telescopic sections forming a fluid chamber with ports therefor adjacent said first mentioned bodies, the ports of said low pressure chamber being formed in the first mentioned bodies, a tube connecting said first ports, a tube concentric with said first tube connecting said second ports, a tube extending longitudinally in the chambers of said first and second bodies around said previously mentioned tubes connecting said third ports, and a tube extending longitudinally in the chambers of said first and second bodies around said previously mentioned tubes connecting said fourth ports.

6. A coupling for connecting a plurality of fluid lines on one structure with the corresponding lines on a structure rotatable relative to said first structure, comprising a first body having a chamber therein and a means for securing said body to one of said structures, a second body having a chamber therein and a means for securing said second body to the other of said structures, each of said bodies having first, second, third, and fourth ports spaced inwardly longitudinally therealong from the outer ends for connection with lines, a third body between said first and second bodies having two relatively rotatable cylindrical telescopic sections forming a fluid chamber, said fluid chamber having inlet and outlet ports formed in the means for securing said first and second bodies, respectively, to said relatively rotatable structures a tube connecting said first ports, a tube concentric with said first tube connecting said second ports, a tube around said previously mentioned tubes connecting said third ports, and a tube around said previously mentioned tubes connecting said fourth ports.

7. A coupling for connecting a plurality of fluid lines on one structure with the corresponding lines on a structure rotatable relative to said first structure, comprising a first body having a chamber therein, a second body having a chamber therein, each of said bodies having first, second, third and fourth ports spaced inwardly longitudinally therealong, a third body between said first and second mentioned bodies having two cylindrical sections forming a chamber, said last mentioned chamber having inlet and outlet ports formed in the relatively rotatable first and second bodies a tube connecting said first ports and yieldably connected in fluid tight relation to said second body for relative rotation therewith, a tube connecting said second ports and being rigidly joined to said first body for rotation therewith and yieldably connected in fluid tight relation to said second body for relative rotation therewith, a tube around said previously mentioned tubes connecting said third ports and being rigidly joined to said second body for rotation therewith and yieldably connected in fluid tight relation to said first body for relatively rotation therewith, and a tube around said previously mentioned tubes connecting said fourth ports and being rigidly joined to said second body for rotation therewith and yieldably connected in fluid tight relation to said first body for relative rotation therewith.

References Cited in the file of this patent
UNITED STATES PATENTS

| | | |
|---|---|---|
| 464,706 | Burns | Dec. 8, 1891 |
| 464,707 | Burns | Dec. 8, 1891 |
| 2,481,568 | Carpenter | Sept. 13, 1949 |
| 2,825,463 | Thomas | Mar. 4, 1958 |

FOREIGN PATENTS

| | | |
|---|---|---|
| 579,817 | France | Oct. 13, 1924 |